May 15, 1934.　　　　E. A. NELSON　　　　1,958,974
METHOD OF CONSTRUCTING A WHEEL
Filed Jan. 5, 1932　　　2 Sheets-Sheet 1
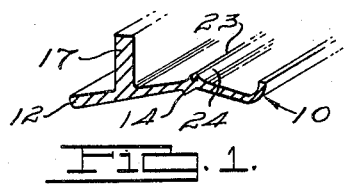
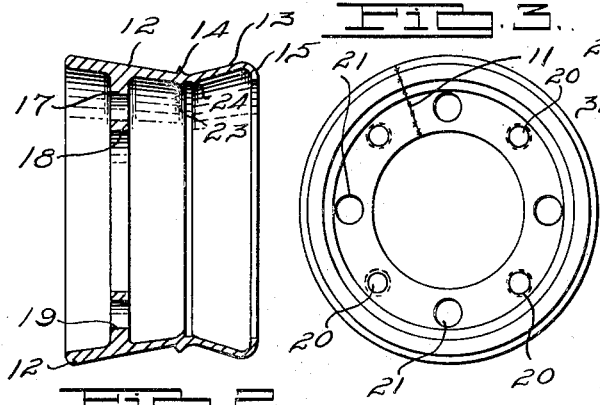
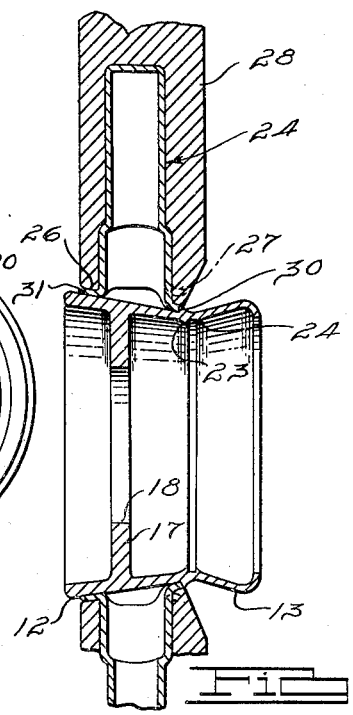
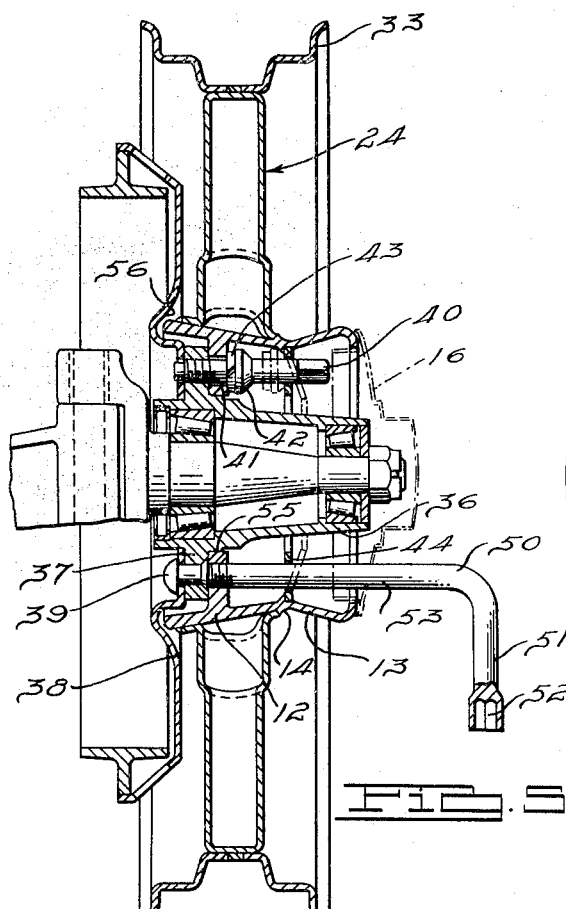
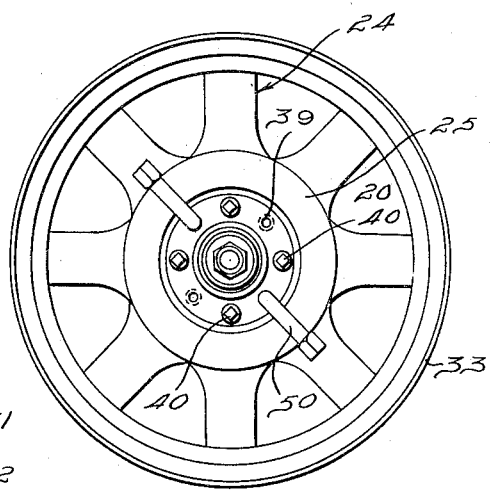
INVENTOR
*Emil A. Nelson.*
BY
*Harness, Dickey, Pierce & Hamm*
ATTORNEYS.

May 15, 1934.  E. A. NELSON  1,958,974
METHOD OF CONSTRUCTING A WHEEL
Filed Jan. 5, 1932  2 Sheets-Sheet 2

INVENTOR
Emil A. Nelson.
BY
Harness Dickey Pierce Hamm
ATTORNEYS.

Patented May 15, 1934

1,958,974

UNITED STATES PATENT OFFICE 1,958,974

METHOD OF CONSTRUCTING A WHEEL

Emil A. Nelson, Detroit, Mich.

Application January 5, 1932, Serial No. 584,825

7 Claims. (Cl. 29—159.03)

The invention relates to wheels and it has particular relation to wheels demountable at the hub.

One object of the invention is to provide a method of assembling and connecting rim supporting means to a hub shell, so as to obtain a rigid and properly aligned wheel construction in an economical and efficient manner.

Another object of the invention is to provide a wheel including a hub shell and a rim supporting member, in which the latter is shrunk upon the hub shell and in such manner that a rigid assembly is provided, in which the rim supporting member is located in the proper plane of wheel rotation.

Another object of the invention is to provide a method of manufacturing a hub shell with hub securing means therefor, in which said securing means finally are so arranged in conjunction with the shell, that they normally will remain assembled therewith when the wheel is removed from the hub.

Other objects of the invention will be apparent from the following description, the drawings relating thereto, and the claims hereinafter set forth.

For a better understanding of the invention reference may be had to the accompanying drawings forming a part of the specification, wherein:

Figure 1 fragmentarily illustrates a formation of sheet steel, from which a hub shell constructed according to one form of the invention may be manufactured;

Fig. 2 is a diametrical cross-sectional view of the hub shell, formed from bending the construction shown by Fig. 1 into circular form and welding its ends;

Fig. 3 is a side view of the construction shown by Fig. 2 particularly illustrating the weld;

Fig. 4 is a cross sectional view of the hub shell also illustrating the manner in which an annular series of metal spoke elements unitarily connected one to another, are assembled and secured to the hub shell;

Fig. 5 is a cross sectional view of a wheel construction involving the assembly shown by Fig. 4, associated with a hub, brake drum and rim, and showing the parts as finally assembled; also this figure illustrates the manner in which tools for manipulating the wheel may be secured to the hub shell;

Fig. 6 is a smaller side view of the wheel shown by Fig. 5 particularly illustrating the manner in which two of the tools shown by Fig. 5 preferably are arranged for wheel manipulating purposes;

Figure 7:
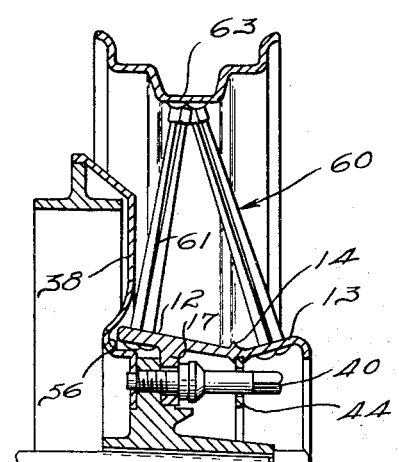
Fig. 7 is a fragmentary cross-sectional view of a wheel, in which the hub shell shown by the above mentioned figures is associated with wire spokes.

In constructing the hub shell, an elongated shell piece 10 may be formed from sheet, strip or hot rolled steel section, and then rolled into annular form and welded at its ends as indicated at 11 in Fig. 3. As thus completed, the shell as shown by Fig. 2 has outer tapering surfaces 12 and 13 diverging outwardly from a point intermediate the ends of the shell, and an annular rib or shoulder 14 located substantially at the junction of the surface portions. The outer extremity of the surface portion 13 terminates in an inwardly directed, short flange 15, such flange being adapted primarily for connecting a hub cap to the shell as shown in broken lines at 16 in Fig. 5. Intermediate the ends of the surface portion 12, the shell is provided with an annular flange 17 on its inner surface, and the inner periphery of this flange defines an opening 18 for receiving a wheel hub. Initially the flange may be provided with bolt receiving openings 19 arranged in circumferentially spaced relation, or such bolt receiving openings may be formed in the flange after the shell is formed into annular shape. While any number of openings in the flange 17 may be provided for accommodating bolts, Fig. 3 illustrates the flange as having 8 openings. Preferably four of such openings, indicated at 20, are spaced 90° circumferentially, and are threaded for receiving threaded ends of wheel manipulating tools which will be described presently. The other openings indicated at 21 preferably are not threaded and may be used for securing the flange 17 to the hub.

Adjacent the annular shoulder 14, the shell is provided on its inner surface with a substantial, annularly extending shoulder 23, and a smaller, annular shoulder 24 spaced therefrom and towards the flange 15, thereby providing an annular groove between such shoulders. The purpose of this groove presently will be set forth.

The shell then may be assembled with rim supporting means and according to Figs. 4, 5 and 6, such rim supporting means is in the form of integrally associated, hollow metal spokes 24 formed from sheet metal. The construction of this rim supporting means may be briefly described as follows, referring to Fig. 6. The metal spokes indicated at 24 are arranged in circumferentially spaced relation and in radial planes, and are connected at their inner ends by means of an integral, circumferentially extending hollow part 25. This wall as shown by Fig. 3 has oppositely disposed leg portions 26 and 27, both leg portions initially being of such diameter that they and the spoke assembly may be slipped over the surface portion 13 of the hub shell and the annular shoulder 14 thereon. The leg 26 may be tapered to engage the tapered surface 12 of the shell adjacent that end of such surface of larger diameter, while the leg 27 is adapted to engage such surface adjacent the shoulder 14. After the spoke assembly is so associated with the shell, the leg 27 or the spoke assembly is so shrunk that the leg abuts the surface 12 and substantially adjacent the side wall of shoulder 14.

It should be understood that initially the smallest inner diameter of the annular portion 25 of the spoke assembly necessarily must be such that it can be slipped over the surface portion 13 of largest diameter, and it may be that the leg 26 will not have to be shrunk to properly engage the surface 12 of the shell. Ordinarily, however, the leg portion 27 will be shrunk into engagement with the shell adjacent the shoulder 14 although of course it should be understood that the entire spoke assembly may be slipped over the shell and then shrunk into position, or that any part thereof necessary to secure the proper engagement of the parts may be shrunk the amount necessary. For shrinking the spoke assembly in the manner desired a shrinking die 28 may be employed and in the particular construction shown, this shrinking die is employed primarily for shrinking the leg 27 into engagement with the shell as previously mentioned, but it also may be used for shrinking the leg 26 if this is necessary or desired, into engagement with the shell. After the parts are so associated, the legs 26 and 27 may be welded to the shell as indicated at 30 and 31. It is apparent that the shoulder 14 will serve as means for properly aligning the spoke assembly in the plane of rotation of the wheel and moreover serve as a positive abutment at the base of the tapered surface 12 for preventing, in addition to the weld, any axial movement of the spoke assembly toward the surface portion 13.

A rim 33, shown as of the drop center type may then be mounted on the outer ends of the spokes by shrinking it on or by merely slipping it over the ends of the spokes and then welding it to the spokes. When the rim is shrunk on the spokes, it is evident that the spoke assembly will be subjected to a still further shrinking tendency, thus still further insuring proper mounting of the spoke assembly on the hub shell.

Preferably the wheel described is adapted to be mounted on a hub 36 shown by Fig. 5, which has an annular, radially disposed flange 37 provided with circumferentially spaced openings coinciding with the openings in the flange 17 of the hub shell. A brake drum disc 38 carrying a drum at its outer periphery is connected to the inner side of the hub flange 37, preferably by means of rivets 39, such rivets having flat heads at their outer ends substantially flush with the outer surface of the flange to permit proper abutment of the hub shell flange 17 thereagainst. Preferably four rivets are used and such rivets project through openings in the flange spaced ninety degrees apart. When the hub shell is associated with the hub, the rivets 39 coincide with the openings 20 in the hub shell flange 17 and it will be recalled that such openings are threaded to permit securing manipulating tools to the shell flange for removing and mounting the wheel. The other openings in the hub flange are threaded and are adapted to receive bolts 40 which project through the openings 21 in the shell flange 17 and through openings in the brake disc member 38. In view of the fact that the bolts 40 normally are associated with the hub shell in such manner that they remain assembled therewith when the shell is removed from the hub, it is desired to particularly describe the manner in which the bolts are assembled with the shell and maintained in such relation.

Referring to Fig. 5, it will be noted that each of the bolts has a threaded end adapted to engage a threaded opening in the hub flange, and an unthreaded portion 41 adapted to project through one of the unthreaded openings 21 in the flange 17 of the shell. Adjacent such portion 41, the bolt has an annular shoulder 42 utilized in drawing the shell flange 17 against the hub flange, and preferably a lock washer 43 will be disposed between the shoulder and shell flange to constantly maintain a tight connection. The outer end of the bolt has a polygonal head for facilitating turning thereof, and consequently, when the head is turned the bolt will be threaded into the hub flange and this operation serves to draw the shoulder 42 and lock washer 43 against the shell flange and hence the latter against the hub flange. The headed end of the bolt projects through a ring plate 44 having circumferentially spaced openings for the bolts, and this plate has its outer peripheral edge disposed in the groove provided between the shoulders 23 and 24 on the inner periphery of the hub shell.

The ring plate is so disposed with respect to the shell flange 17 and the bolt is of such length, that when the latter is separated from the hub flange the shoulder 42 cannot be moved sufficiently toward the outer end of the shell to permit the threaded end of the bolt to fall out of the opening in the shell flange. Consequently, the bolt will be able to move axially through the shell flange 17 and the ring plate 44 for manipulating purposes but when disconnected from the hub flange, it cannot be separated from the shell. Therefore the bolts always remain assembled with the shell. This is advantageous because it prevents loss of bolts and moreover the bolts are always in proper position and it is only necessary to tighten them to secure the wheel to the hub.

The ring plate 44 may be positioned in the hub shell in the following manner. Originally the plate may be slightly conical in form and its outer peripheral edge is of such diameter that it can be disposed between the shoulders 23 and 24 of the shell. After so positioning the plate, axial pressure is exerted against the central portion thereof and its form is changed from conical to that in which it defines a radial plane. During this operation it is manifest that the outer peripheral portion of the plate must increase in diameter and this change in diameter causes the outer peripheral edge to be forced tightly against the shell between the shoulders 23 and 24. After so positioning the plate by means of pressure, it is apparent that during all practical operations of the wheel the plate will not loosen. The heads on the bolt project outwardly of the ring plate at all times and hence may be manipulated without difficulty through the opening in the outer end of the shell.

For tightening the bolts as well as removing and mounting the wheel, tools indicated at 50 are provided, each of which has a bent end portion 51 provided with a polygonal socket 52 for engaging the heads on the bolts, and a portion 53 having a threaded end adapted to engage one of the threaded openings 20 in the shell flange 17. When the tool is used for tightening the bolts, the polygonal head 52 is employed whereas when it is desired to remove the wheel the threaded end of the tool is threaded into an opening 20 in the shell flange 17. Preferably two tools will be used as shown by Fig. 6, in removing the wheel and disposed in diametrically opposed relation. Under such conditions, the bent portions 51 of the tools serve as handles permitting an operator to lift the wheel readily in the mounting and demounting thereof. After the wheel is mounted the tools of course are not used except for the purpose of tightening the bolts.

It is to be noted that the arrangement of the bolts, and the provision of the retaining ring 44 and the tools 50, permits locating the bolts closely adjacent to the inner hub shell surface, because it is unnecessary to provide a large clearance between the bolts and hub shell for enabling an operator to place and initially manipulate the bolts with the fingers. It follows that a smaller and less expansive hub shell may be used, while still having the bolts concealed within the shell. Particularly the above described arrangement in conjunction with the extension of the shell over the hub flange and into the plane of the brake drum, while maintaining the shell close to the hub flange, permits using a shell of minimum diameter while still providing a proper support and location for the rim and tire tread and readily accessible, manipulatable and concealed securing bolts.

As the hub shell is mounted on the hub, the flange 17 thereon has a reasonably close fit with surface wall 55 on the hub although preferably radial movement of the wheel with respect to the hub is prevented by clamping action of the bolts 40. Also when the hub shell is in its proper and operative position the outer extremity of the tapered surface portion 12 thereof projects over and beyond the hub flange 37 and into an annular recessed portion 56 of the brake disc member 38. This assembly and relation of parts permits disposing the hub shell close to the brake disc, as well as the brake disc close to the rim supporting means such as the metal spokes. Hence the parts may be assembled in a close, nested relation and less axial space will be taken up by the wheel and it follows that body lines of vehicles upon which the wheel is adapted to be mounted need not be changed as much to accommodate parts of the wheel. Moreover, this arrangement permits using longer spokes in the inner series of spokes, and at the same time locating the tread of the wheel nearer to the plane of the brake drum which is desirable particularly in front wheel constructions because steering is made easier.

It is preferred to chrome plate the outer surface of the hub shell, from the outer end thereof to and including the shoulder 14, and it is evident then that the latter serves as a convenient stopping line during the chrome plating operation. Ordinarily this part of the hub shell is the only part of the wheel which normally is subjected to marring or scratching factors such as flying stones, etc. Preferably the remainder of the wheel surfaces exposed will be painted, and this feature in conjunction with the outer chrome plated shell portion, insures a neat and attractive wheel that will under ordinary conditions maintain its finished appearance.

Figure 7 illustrates the same wheel hub, brake disc, and hub shell arrangement but in this construction wire spokes are employed for supporting the rim. Preferably the spokes are arranged in two series indicated at 60 and 61, the first series being secured at its inner end to the surface portion 13 of the hub shell and the second series secured to the surface portion 12 of the shell and adjacent the brake disc 38. It will be noted that the surfaces 12 and 13 in this case are substantially perpendicular respectively to the two series of spokes and this arrangement is desirable in a wheel construction to properly take care of the vehicle load. The series of spokes 60 and 61 converge outwardly and are connected in this instance to a drop center rim indicated at 63. Obviously, however, different forms of rims may be used in conjunction with the spokes.

It will be noted that the inner series of spokes are anchored close to the hub, substantially in the plane of the brake drum, and to that portion of the shell projecting over the hub flange and into the recess in the brake disc. This arrangement permits using smaller rims, without requiring an undesirably short inner series of spokes, and at the same time permits location of the wheel tread desirably near to the plane of the brake drum.

Figure 8:
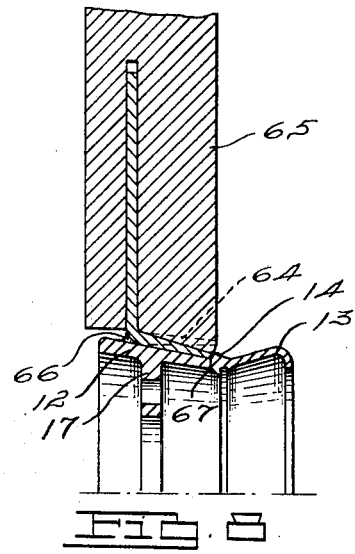
Fig. 8 illustrates the manner in which a disc for supporting the rim, is associated with the hub shell.

Fig. 8 illustrates the manner in which a disc wheel member may be mounted on the shell. Preferably the disc initially is directed radially and is provided with a central flange 64, annular in character which is of such diameter that it can be slipped over the tapered surface 13. Then the flange portion is shrunk inwardly by means of a suitable shrinking die 65 until it contacts with the surface 12 on the shell. In this connection the marginal edge of the flange 64 will be brought down inwardly of the shoulder 14 on the shell and when so positioned the disc preferably will be welded to the shell at axially spaced points indicated at 66 and 67. It is obvious that the shoulder 14 serves as an aligning feature for positively aligning the disc in the plane of wheel rotation. It should be apparent that the flange 64 on the disc alone may be shrunk downwardly into engagement with the shell or that the entire disc may be shrunk should this prove advantageous.

Figure 9:
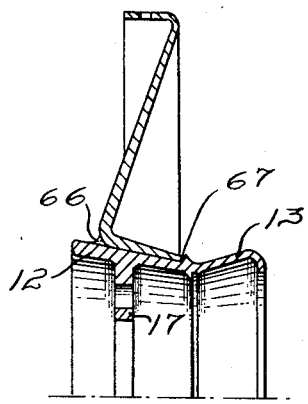
Fig. 9 is a view similar to Fig. 8 illustrating the manner in which the disc finally is connected to the hub shell, and provided with a rim supporting flange at its outer peripheral edge.
Figure 10:
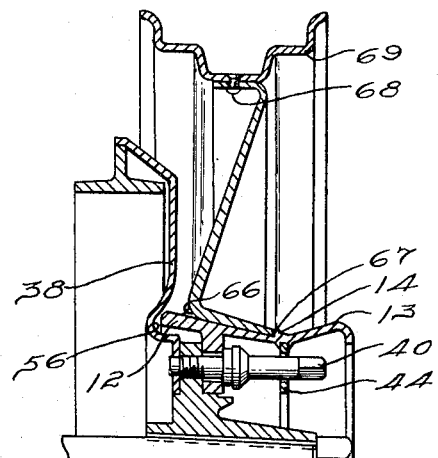
Fig. 10 is a similar cross-sectional view, but also including the hub and brake drum, and illustrating a rim mounted on the wheel and the manner in which the disc is disposed with respect to the brake drum.

Figure 9 illustrates the disc after it has been changed from a radial plane position to one of conical formation ordinarily characteristic of disc wheel formations. In changing the plane of the disc, an outer flange 67 is provided which is adapted to be secured to a rim 69 by means of rivets 68 or any other suitable securing means, as shown by Fig. 10.

Figures 11, 12:
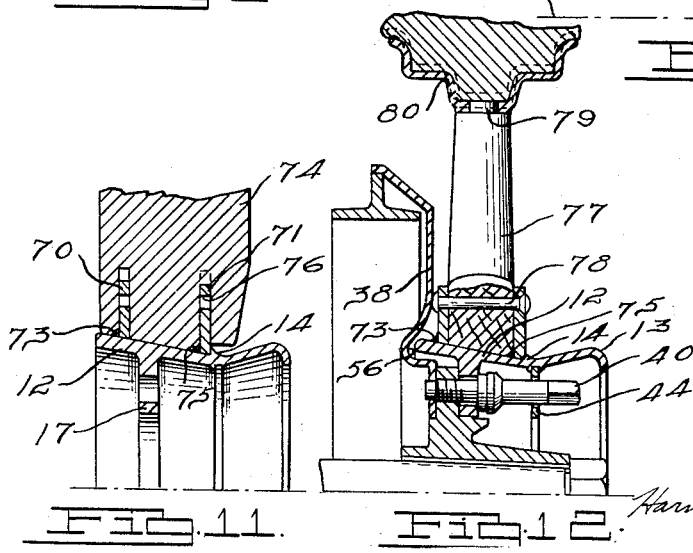
Fig. 11 is a fragmentary cross-sectional view of the hub shell, illustrating the manner in which annular plates for securing wood spokes to the shell are first assembled with such shell.
Fig. 12 illustrates the construction shown by Fig. 11, with the wood spokes arranged in their proper position and secured to the hub shell.

Figs. 11 and 12 illustrate the manner in which wood spokes may be mounted on the hub shell, and for securing such spokes to the shell, a pair of ring plates 70 and 71 are provided, the ring plate 70 being adapted to engage the surface 12 on the shell adjacent the inner end of the latter and the plate 71 to engage the shell closely adjacent to the shoulder 14 but still on the surface 12. The plate 70 may be slipped over the shell and into proper position on the surface 12 and may or may not be shrunk thereon and then welded to the shell as indicated at 73. Normally the plate 71 will have to be shrunk into engagement with the surface 12 adjacent the shoulder 14 in the manner previously described in connection with the disc and metal spoke wheel and for this purpose a shrinking die 74 may be employed. The plate 71 preferably is shrunk into engagement with the surface 12 adjacent the shoulder 14 and then is welded as indicated at 75 thereto. The plates will be provided with suitable openings 76 for connecting spokes 77 thereto, it being manifest that each spoke may be moved into position between the plates and then secured by bolts indicated at 78. Preferably the outer ends of the spokes will be provided with reduced portions indicated at 79 and then a rim indicated at 80 may be shrunk thereon. Hence, as finally assembled a rigid construction is provided with the wooden spokes located closely adjacent to the brake disc member, thereby obtaining an assembly taking up less axial space.

From the above description taken in connection with the various figures in the drawings, it should be apparent that a wheel assembly has been provided which requires less axial space and hence avoids irregularities in body lines of vehicles ordinarily necessary to accommodate parts of the wheel because of its axial length. Moreover, it is apparent that as so assembled, the rim supporting means are located adjacent to the brake drum and more directly over the hub portion upon which the hub shell is supported. It also is apparent that a novel form of hub shell has been provided which preferably is constructed of sheet steel and that a novel method of constructing the shell is advanced, all of which increases the efficiency of manufacturing operations. It is also apparent that novel means are provided for demounting and mounting the wheel in the form of tools adapted to cooperate with the hub shell and openings in the flange thereon, and that such tools may be connected to the shell in a positive manner for facilitating manipulation of the wheel by an operator. It is also apparent that the bolts for securing the hub shell to the hub are always maintained assembled with the former, thereby avoiding loss of bolts as well as avoiding manual placing and removing thereof. It is also apparent that a novel hub shell construction for this purpose has been provided and a novel method of assembling the bolts with the shell and maintaining them so assembled has been advanced which renders it easy to properly position the bolts and leave them in their normally axially disposed positions. Moreover, a novel manner of fastening rim supporting means on the hub shell has been provided which facilitates manufacturing the shell economically and efficiently and in such manner that when the rim supporting means are associated with the shell the wheel is properly aligned with the plane of rotation and positively maintained rigidly connected to the shell.

Although certain forms of the invention have been described and illustrated, it will be apparent to those skilled in the art that various modifications may be made without departing from the scope of the appended claims.

I claim:

1. The method of manufacturing a wheel including a hub shell and a rim supporting member, which comprises forming the shell with an outer surface having outwardly diverging walls, and contracting the rim supporting member into engagement with such diverging walls.

2. The method of manufacturing a wheel including a hub shell and a rim supporting member, which comprises forming the shell with an outer surface having outwardly diverging walls, and contracting the rim supporting member between such walls and toward the junction thereof.

3. The method of manufacturing an assembly of hub shell and an annular rim supporting member, which comprises forming a hub shell with an intermediate portion of smaller diameter than an end portion, slipping an annular rim supporting member having a central opening larger than such end of the shell, over the latter and over the smaller intermediate portion thereof, shrinking the rim supporting member into engagement with such intermediate portion of the shell, and then welding such parts together.

4. The method of constructing a wheel which comprises forming a hub member with outer surface portions of different diameters, forming a rim supporting member with a hub member receiving central aperture and centrally located, axially spaced legs, slipping the rim supporting member over the hub member, and then changing the diameter of one of the members to cause the legs on the rim supporting member to respectively contact substantially with said surface portions.

5. The method of constructing a wheel which comprises forming a hub member with outer surface portions of different diameters, forming a rim supporting member with a hub member receiving central aperture, and central axially spaced legs, slipping the rim supporting member over the hub member and then changing the diameter of one of the members to cause the legs on the rim supporting member to respectively contact substantially with said surface portions, and then welding contacting portions of the parts.

6. The method of constructing a wheel which comprises forming a hub member with a tapered outer surface and a shoulder at the smaller end of the tapered surface, forming a rim supporting member with circumferentially spaced spokes, a central aperture for receiving the hub member, and central axially spaced legs of such diameter as to permit slipping the member over the hub member until the legs are disposed respectively over the tapered surface, assembling the members in this manner and then changing the diameter of one of the members to cause the legs to seat on the tapered surface, and one of the legs to substantially abut against the shoulder.

7. The method of constructing a wheel which comprises forming a hub member with a tapered outer surface and a shoulder at the smaller end of the tapered surface, forming a rim supporting member with circumferentially spaced spokes, a central aperture for receiving the hub member, and central axially spaced legs of such diameter as to permit slipping the member over the hub member until the legs are disposed over the tapered surface, assembling the members in this manner, and then shrinking the rim member to cause the legs to seat on the tapered surface and one of the legs against the shoulder.

EMIL A. NELSON.